No. 877,961. PATENTED FEB. 4, 1908.
W. F. STEARNS.
TIRE CONSTRUCTION.
APPLICATION FILED FEB. 15, 1906.
2 SHEETS—SHEET 1.
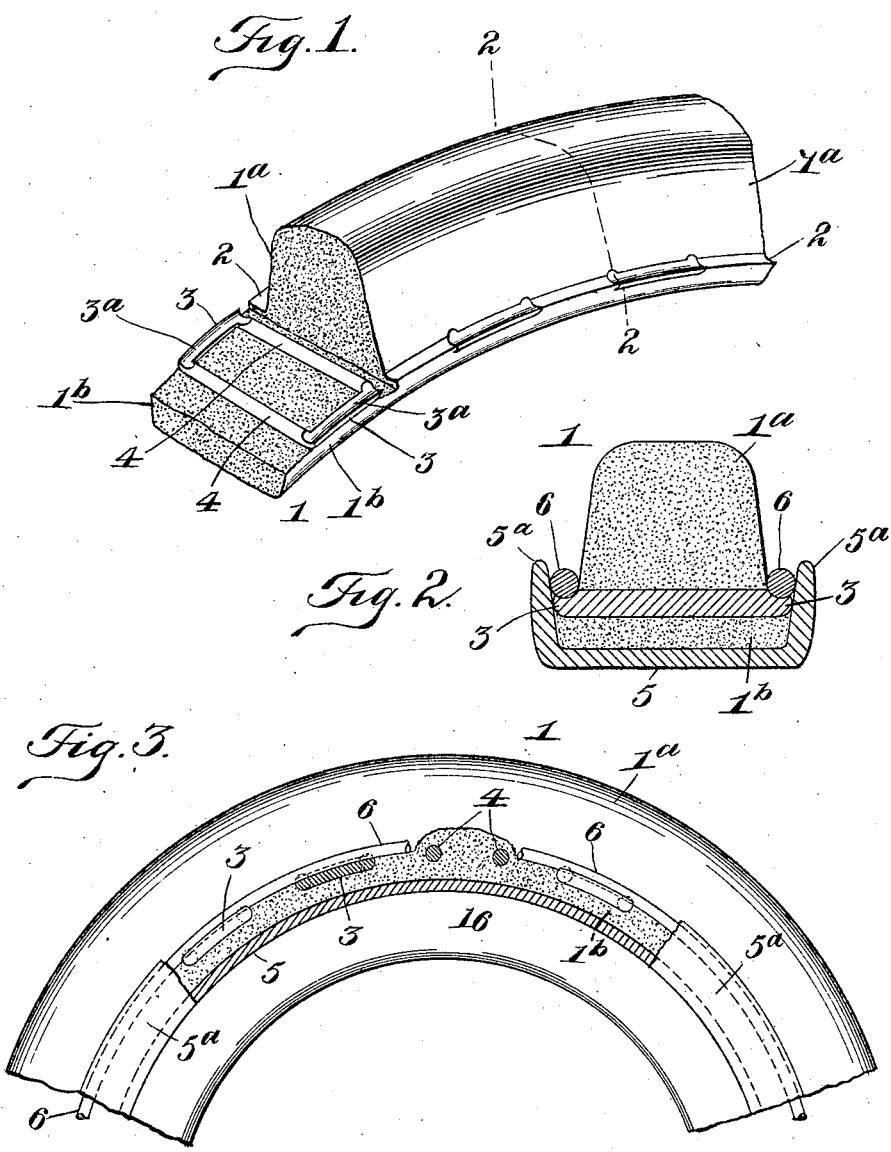
Witnesses
A. B. Mattingly
M. Herskovitz
Inventor:
William F. Stearns
By his Attorneys
Beach & Clahman No. 877,961. PATENTED FEB. 4, 1908.
W. F. STEARNS.
TIRE CONSTRUCTION.
APPLICATION FILED FEB. 15, 1906.
2 SHEETS—SHEET 2.
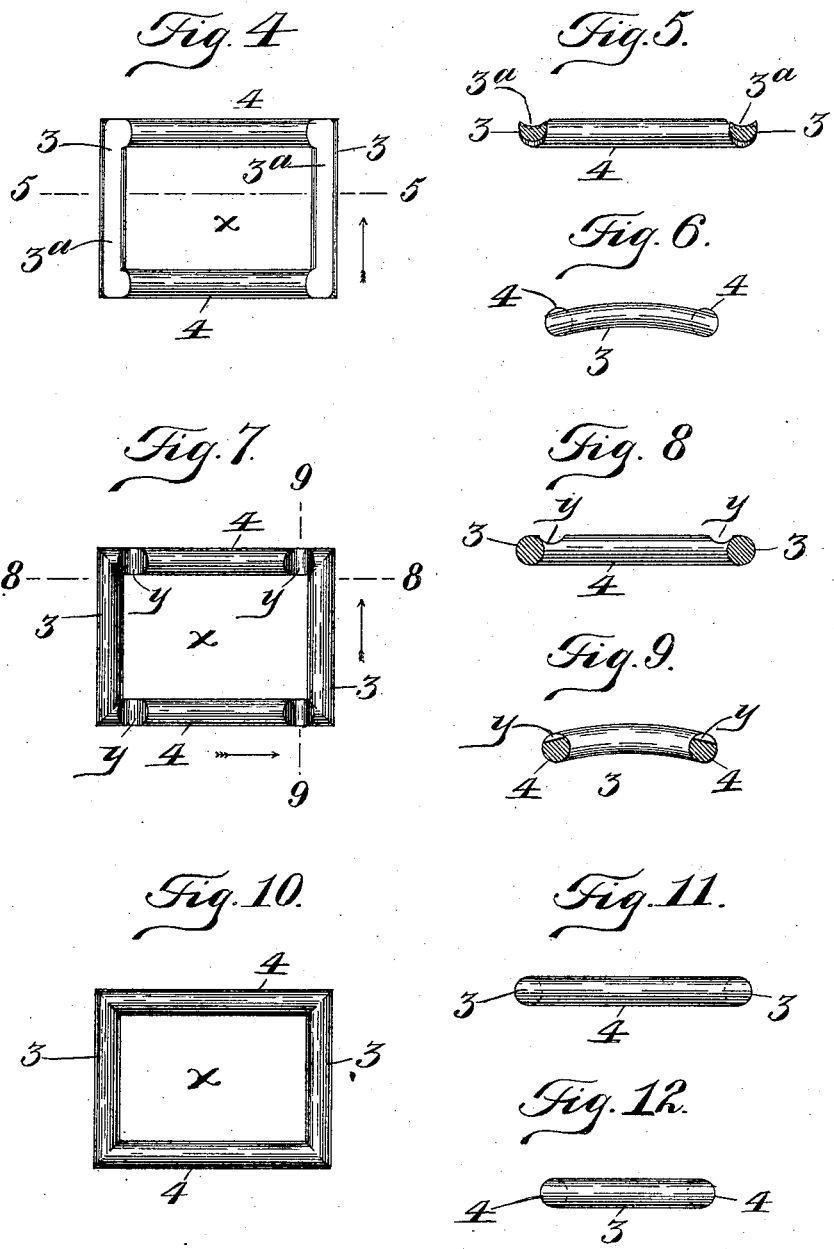

UNITED STATES PATENT OFFICE.

WILLIAM F. STEARNS, OF BATAVIA, NEW YORK.

TIRE CONSTRUCTION.

No. 877,961.  Specification of Letters Patent.  Patented Feb. 4, 1908.

Application filed February 15, 1906. Serial No. 301,191.

To all whom it may concern:

Be it known that I, WILLIAM F. STEARNS, a citizen of the United States, residing at Batavia, county of Genesee, and State of New York, have invented a new and useful Improvement in Tire Construction, of which the following is a description.

My invention relates to improvements in the construction of what are commonly known in the trade as "outside wire tires." The objects of my invention are to combine a rubber or like tire having laterally projecting flanges around each side of its base, with a series of separate, quadrilateral, metallic, open-bodied cross-pieces that are spaced apart and embedded in the tire, with the outer surfaces of their ends substantially in the plane of the outer surfaces of the tire flanges and with their ends forced into positive engagement with the inner surfaces of the side-walls of the flanges by the "outside wires", the transverse portions of the metallic cross-pieces being also substantially in a transverse plane of the tire which is substantially coincident with the outer surfaces of the tire flanges. These objects I carry out by means of the devices illustrated in the accompanying drawings, in which Figure 1 is a perspective of part of a rubber tire provided with one form of my new metallic cross-pieces; Fig. 2 is a transverse section of the tire provided with said cross-pieces and seated in a channel-iron of well known form. This section is taken at a line corresponding to line 2—2 of Fig. 1; Fig. 3 is a side elevation of a part of a tire provided with my new cross-pieces, seated in a channel-iron mounted on a felly. In this view parts are broken away to more nearly indicate the cross section; Fig. 4 is a top plan view of the preferred form of my new metallic cross-piece; Fig. 5 is a partial side elevation and a section thereof at line 5—5 of Fig. 4; Fig. 6 is an end elevation of the cross-piece shown in Fig. 4; Fig. 7 is another form of my new metallic cross-piece; Fig. 8 is a partial side elevation and a partial section thereof at line 8—8 of Fig. 7, and Fig. 9 is a partial end elevation and a partial section thereof at line 9—9 of Fig. 7; Figs. 10, 11 and 12, respectively indicate a top plan view, side elevation and an end elevation of another form of my new metallic cross-piece.

In the drawings illustrating my invention in the best form now known to me, 1 indicates a solid rubber tire having near its base laterally-extending flanges 2, 2, one on either side. In accordance with my invention, I embed in the tire, towards the base thereof, a series of rectangular, metallic cross-pieces, each having an opening or clear space $x$ between its opposite flat ends 3, 3 and opposite sides 4, 4, so that the tire material (of rubber or rubber-like composition) passes integrally through the opening in each cross-piece and better and more strongly embeds the opposite sides 4, 4 thereof. The lateral end portions 3, 3, of each cross-piece, project beyond those side-portions 1ª of the tire, that extend upwardly from its said lateral flanges 2, 2. The end-portions 3, 3 are substantially flush with the sides of the base-portion of the tire, below its said flanges 2, 2. The upper surfaces of the ends 3, 3 of each cross-piece are in or near the upper surface of the tire flanges 2, 2. The upper surfaces of the ends 3 are preferably grooved at 3ª, these grooves extending crosswise of the end portions of said cross-pieces and in the direction of the circumferential periphery of the tire. To more nearly effect this, it is convenient to slightly curve the cross-pieces from side 4 to side 4, as best shown in Fig. 6. The rubber tire, after being provided with a suitable number of these metallic cross-pieces in the course of its manufacture is mounted in a channel-iron having a peripheral, circumferential groove and carried usually by a felly 16 (or otherwise as may be desired), the base 5 of the channel-iron having two integral side-portions or flanges 5ª, 5ª. When the tire, with its embedded cross-pieces, is mounted in the channel-iron, the flat ends 3, 3 of the cross-pieces bear directly against the inner surfaces of the sides 5ª of the channel-iron, and then so-called outside wires 6 are placed circumferentially around the wheel, resting on the upper surfaces of flanges 2, 2 and on the opposite and laterally-projecting upper surfaces of the embedded cross-pieces. In the preferred construction, the retaining wires 6, 6 (one on each side of the tire) rest in the grooves 3ª, 3ª, so that the tendency of the cross-pieces to work out from under the retaining wires is greatly minimized. A slight curvature of the upper surfaces of the projecting ends 3ª, 3ª, referred to facilitates the proper interaction of the retaining wires with the projecting ends of the cross-pieces by effecting a curving, instead of a marked angling of the wires at their contact with the projecting ends of the cross-pieces. This, however, is a matter of minor importance, but is novel with me. The flat ends 3, 3 of the cross-pieces form long and, therefore, more durable bearings with the inner walls of the channel-iron sides 5ª, 5ª, and this is an important feature of my invention, because the long contact of the ends 3, 3 with the inner surfaces of said sides 5ª, 5ª, gives a certain steadiness of contact that is not obtainable where the cross-pieces are in the form of transverse pins, as in the Swinehart patent, #624,992 of May 16, 1899, for example.

While in Figs. 1, 2 and 3 I have shown the upper surfaces of the projecting ends of the cross-pieces, as directly exposed, that is, so that they will come in direct contact with the retaining-wires, yet it will be understood that the material of which the tires are made may or may not extend over the upper or outward surfaces of said projecting ends.

In Figs. 7, 8 and 9 I show a form of my new open-bodied rectangular cross-piece that is slightly curved from side to side, as in the preferred form, but which, instead of having the grooves 3ª, 3ª, is formed with notches $y$ on the upper surface of its long sides 4, 4 for engagement with the retaining wires.

In Figs. 10, 11 and 12 I show another form which is flat and not curved, and which is not of my rectangle, open-bodied cross-piece, provided with any grooves or notches for the reception of the retaining wires.

In all forms of my invention, the ends 3—3 of the metal cross-pieces are straight so that they will be parallel with and bear directly, or indirectly, against the inner walls of the flanges 5ª of the channel-iron, thus affording a long bearing at each point of their contact with said flanges 5ª. In the actual molding of the tires it will frequently happen that a thin layer of rubber will come on the upper surfaces of the ends of the channel-pieces and also cross their ends; but this does not interfere with the utility of the invention. These ends 3—3 or extremities of the cross-pieces extend in the direction of the circumference of the tire and in direct or indirect contact with the inner surfaces of said flanges 5ª.

The outside retaining wires 6 force the outer ends of the metallic cross-pieces into direct engagement with the inner walls of the side flanges 5ª of the channel-iron, the wires 6 resting against these walls and also on the outer surfaces of the end portions of the metallic cross-pieces, whose outer surfaces are substantially in the plane of the tire flanges 2. The transverse sides 4, 4 of the metallic cross-pieces are straight, and substantially parallel, and are also substantially in a transverse plane of the tire, that is coinciden twith the outer surfaces of the flanges 2; so that, the embedded cross-pieces do not project upwardly into the body of the tire, outwardly of the tire flanges 2, as would be the case if the cross-pieces were arched outwardly after the fashion of the cross-pieces shown, for example, in the Auld patent, No. 812,321, of Feb. 13, 1906, the subject matter of which I am familiar with, and disclaim.

What I claim is:—

In tire construction, the combination of a channel-iron with an elastic tire having a laterally-projecting, circumferentially-extending flange at each side of its base; a series of separate, quadrilateral, metallic, open-bodied cross-pieces spaced apart one from another, and embedded crosswise of and in the tire, with their end walls in contact with the inner walls of the side flanges of the channel-iron, and the outer surfaces of their end walls substantially flush with the outer surfaces of the tire flanges; and a circumferentially-extending retaining-wire around each tire flange, the wires binding the ends of the cross-pieces against the inner side walls of the channel-iron flanges, and the transverse portions of the metallic cross-pieces being substantially in a transverse plane of the tire, co-incident with the outer surfaces of the tire flanges.

In testimony whereof I have hereunto signed my name in the presence of two subscribing witnesses.

WILLIAM F. STEARNS.

Witnesses:
LOUIS WIARD,
W. G. POLLARD.